US007440250B2

(12) United States Patent
Terhorst

(10) Patent No.: US 7,440,250 B2
(45) Date of Patent: Oct. 21, 2008

(54) CIRCUIT BREAKER INCLUDING OPEN NEUTRAL INTERLOCK

(75) Inventor: Bruce R. Terhorst, Burgettstown, PA (US)

(73) Assignee: Eaton Corporation, Cleveland, OH (US)

( * ) Notice: Subject to any disclaimer, the term of this patent is extended or adjusted under 35 U.S.C. 154(b) by 289 days.

(21) Appl. No.: 11/290,704

(22) Filed: Nov. 30, 2005

(65) Prior Publication Data

US 2007/0121268 A1 May 31, 2007

(51) Int. Cl.
*H01H 73/00* (2006.01)
*H02H 3/00* (2006.01)

(52) U.S. Cl. ........................................ 361/115; 361/42

(58) Field of Classification Search .................. 361/42, 361/115
See application file for complete search history.

(56) References Cited

U.S. PATENT DOCUMENTS

| | | | | |
|---|---|---|---|---|
| 3,946,282 | A * | 3/1976 | Weiss et al. | 361/77 |
| 4,041,423 | A * | 8/1977 | Ophaug et al. | 335/20 |
| 4,423,336 | A | 12/1983 | Iverson et al. | |
| 4,973,927 | A | 11/1990 | Carothers et al. | |
| 5,142,112 | A | 8/1992 | Parks et al. | |
| 5,224,006 | A | 6/1993 | MacKenzie et al. | |
| 5,260,676 | A | 11/1993 | Patel et al. | |
| 5,293,522 | A | 3/1994 | Fello et al. | |
| 5,600,524 | A | 2/1997 | Neiger et al. | |
| 5,691,869 | A | 11/1997 | Engel et al. | |
| 5,982,593 | A | 11/1999 | Kimblin et al. | |
| 5,999,384 | A * | 12/1999 | Chen et al. | 361/42 |
| 5,999,385 | A * | 12/1999 | Fello et al. | 361/42 |
| 6,014,297 | A | 1/2000 | Clarey et al. | |
| 6,040,967 | A | 3/2000 | DiSalvo | |
| 6,288,882 | B1 | 9/2001 | DiSalvo et al. | |
| 6,477,022 | B1 | 11/2002 | Ennis et al. | |
| 6,487,057 | B1 | 11/2002 | Natili | |

FOREIGN PATENT DOCUMENTS

| | | | |
|---|---|---|---|
| DE | 10 2004 019532 | A1 | 11/2005 |
| EP | 0526071 | A2 | 2/1993 |
| WO | WO 2004/070753 | A2 | 8/2004 |

* cited by examiner

*Primary Examiner*—Ronald W Leja
(74) *Attorney, Agent, or Firm*—Martin J. Moran

(57) ABSTRACT

A circuit breaker includes line and load terminals, separable contacts electrically connected between the line and load terminals, and a line neutral pigtail. An operating mechanism including an operating handle is adapted to open and close the contacts. A trip circuit responds to current flowing through the contacts and cooperates with the operating mechanism in response to predetermined current conditions to open the contacts. The trip circuit is powered from the line terminal and the line neutral pigtail. A solenoid includes a plunger and a coil, which is energized from the line terminal and the line neutral pigtail. The plunger engages the operating handle when the coil is not energized to prevent movement of the handle from the open to the closed position thereof. The plunger disengages from the operating handle when the coil is energized to permit movement of the handle from the open to the closed position thereof.

12 Claims, 2 Drawing Sheets

CIRCUIT BREAKER INCLUDING OPEN NEUTRAL INTERLOCK

BACKGROUND OF THE INVENTION

1. Field of the Invention

This invention relates to circuit interrupters and, more particularly, to circuit breakers including a trip mechanism, such as a ground fault and/or an arc fault trip mechanism.

2. Background Information

Circuit breakers are generally old and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

In many applications, the miniature circuit breaker also provides ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device. See, for example, U.S. Pat. Nos. 5,260,676; and 5,293,522.

Recently, there has been considerable interest in also providing protection against arc faults. Arc faults are intermittent high impedance faults which can be caused, for instance, by worn insulation between adjacent conductors, by exposed ends between broken conductors, by faulty connections, and in other situations where conducting elements are in close proximity. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; and 5,691,869.

Arc fault circuit interrupters (AFCIs) and ground fault circuit interrupters (GFCIs) can function as a conventional circuit interrupter (e.g., thermal-magnetic) without connecting a pigtail to the line neutral bus. Without this neutral connection, the AFCI or GFCI electrical trip circuit is not powered. As a result, this allows improper use of the circuit interrupter in which it supplies power to a load without providing arc fault or ground fault protection.

An open neutral condition, which is defined in Underwriters Laboratories (UL) Standard PAG 943A, may exist with the electrical wires supplying electrical power to GFCI devices. If an open neutral condition exists with the neutral wire on the line (versus the load) side of the GFCI device, then an instance may arise where a current path is created from the phase (or hot) wire supplying power to the GFCI device through the load side of the device and a person to ground. In the event that an open neutral condition exists, some GFCI devices which have tripped, may be reset even though the open neutral condition may remain.

U.S. Pat. No. 6,040,967 discloses a resettable GFCI receptacle that includes a reset lock-out mechanism to prevent the resetting of electrical connections between input and output conductors if the circuit interrupting mechanism used to break the connection is non-operational or if an open neutral condition exists. U.S. Pat. No. 6,040,967 states that the reset lock-out mechanism can be included in resettable circuit interrupting devices, including GFCIs, AFCIs, immersion detection circuit interrupters and appliance leakage circuit interrupters. A test button is used to activate a test cycle, which tests the operation of the circuit interrupting mechanism. A reset button is used to activate a reset cycle, which reestablishes electrical continuity between the input and output conductive paths or conductors. While the reset button is being depressed, reset contacts are closed to complete a test circuit so that the test cycle is activated. During the test cycle, a plunger moves a banger upwardly so that the banger strikes a latch member pivoting a latch finger while the latch member continues to move. As a result, the latch finger is lifted over one side of the remote end of a movable contact arm onto the other side thereof. After tripping, a coil assembly is de-energized so that the plunger returns to its original extended position, and the banger releases the latch member so that the latch finger is in a reset position. Release of the reset button causes the latching member and movable contact arm to move until the contacts are closed.

There is room for improvement in circuit breakers. There is also room for improvement in circuit breakers employing a line neutral connection to power a trip circuit.

SUMMARY OF THE INVENTION

These needs and others are met by the present invention, which provides a circuit breaker including an electro-mechanical interlock. This interlock is potentially active when the circuit breaker operating handle is in the open position. The interlock does not allow the operating handle to be moved to the closed position if the line neutral connection (e.g., line neutral pigtail) is not electrically connected to a line neutral bus. Hence, the circuit breaker must have the line neutral connection properly electrically connected to operate the circuit breaker and to energize the interlock. Otherwise, the de-energized interlock prevents closure of the separable contacts and the supply of power to the load if the circuit breaker is improperly wired.

An electro-mechanical device, such as a solenoid, is powered from the line connection and the line neutral connection. When the solenoid is energized, this disengages the solenoid plunger from the operating mechanism.

In accordance with the invention, a circuit breaker comprises: a line connection; a load connection; separable contacts electrically connected between the line connection and the load connection; a line neutral connection; an operating mechanism adapted to open and close the separable contacts, the operating mechanism moving between an open position wherein the line connection is electrically disconnected from the load connection and a closed position wherein the line connection is electrically connected to the load connection; a trip circuit responsive to current flowing through the separable contacts and cooperating with the operating mechanism in response to predetermined current conditions to open the separable contacts, the trip circuit being powered from the line connection and the line neutral connection; and an electro-mechanical device including a coil and a plunger, the coil being energized from the line connection and the line neutral connection, the plunger engaging the operating mechanism when the coil is not energized to prevent movement of the operating mechanism from the open position to the closed position thereof, the plunger disengaging from the operating mechanism when the coil is energized to permit movement of the operating mechanism from the open position to the closed position thereof.

The operating mechanism may include an operating handle. The plunger may engage the operating handle when the coil is not energized to prevent movement of the operating mechanism from the open position to the closed position thereof. The plunger may disengage from the operating handle when the coil is energized to permit movement of the operating mechanism from the open position to the closed position thereof.

The operating handle may include an insertion barrier. The plunger may engage the insertion barrier of the operating handle when the coil is not energized to prevent movement of the operating mechanism from the open position to the closed position thereof.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a single pole miniature circuit breaker of the type commonly used in residential and light commercial applications. However, it will be evident to those skilled in the art that the invention is also applicable to other types of circuit interrupters as well.

Figure 1:
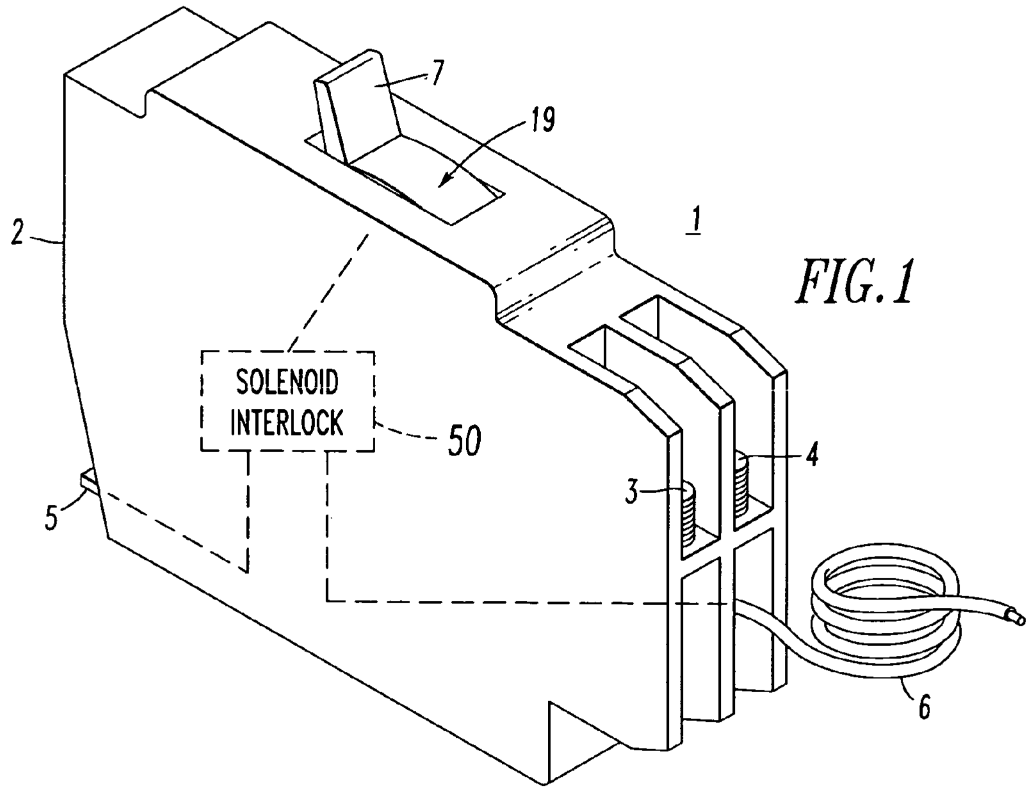
FIG. 1 is an isometric view of a circuit breaker in accordance with the present invention.

Referring to FIG. 1, the circuit breaker 1 includes a housing 2 which is assembled from a number of molded sections composed of an electrically insulating material, as is well known. Terminals 3 (load) and 4 (load neutral) are provided at one end of the housing 2 for electrically connecting the circuit breaker 1 to a load (not shown). A terminal (line), such as stab 5, at the opposite end of the housing 2 and a pigtail 6 (line neutral) electrically connect the circuit breaker 1 to a commercial power distribution system (not shown). A molded handle 7 projects from the housing 2 for manually opening and closing the circuit breaker 1.

Figure 2:
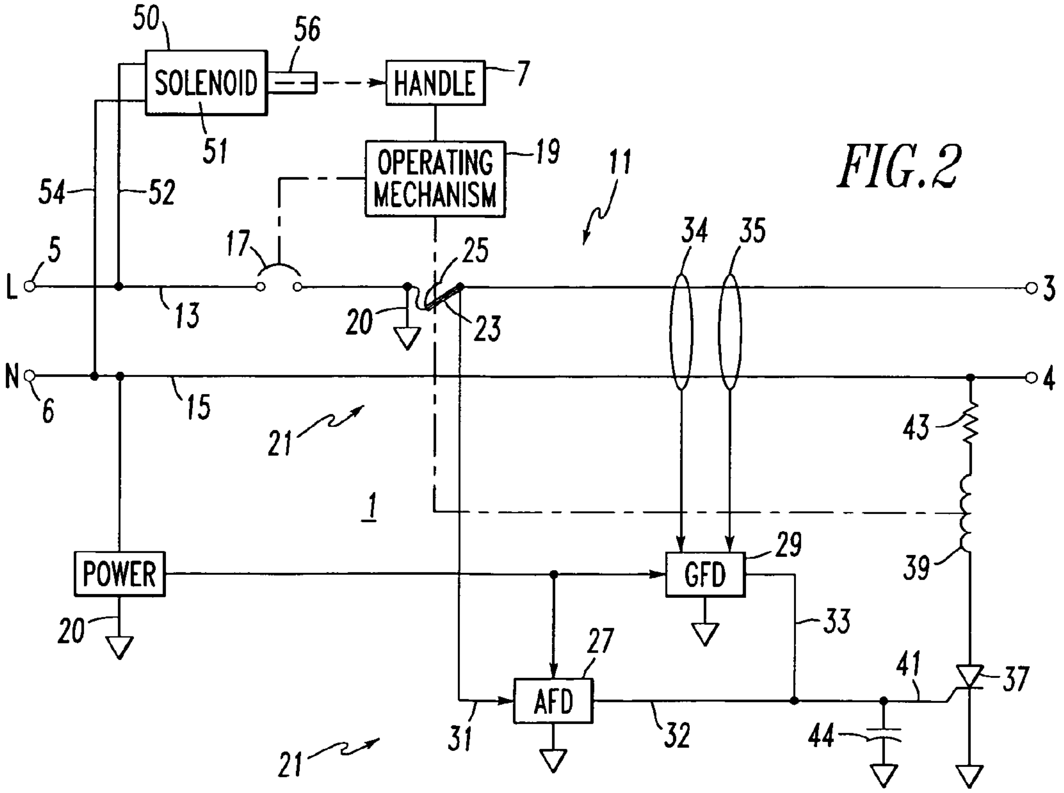
FIG. 2 is a schematic diagram of the circuit breaker of FIG. 1 including an operating handle and a solenoid interlock.

As shown in FIG. 2, the circuit breaker 1 is connected in an electric power system 11 which has a line conductor 13 and a neutral conductor 15. The circuit breaker 1 includes separable contacts 17 which are mounted in the housing 2 of FIG. 1 and are electrically connected in the line conductor 13 between the stab 5 and the load terminal 3. The separable contacts 17 are opened and closed by an operating mechanism 19, which includes the operating handle 7. The operating mechanism 19 moves between an open position wherein the stab 5 is electrically disconnected from the load terminal 3 and a closed position wherein the stab 5 is electrically connected to the load terminal 3.

In addition to being operated manually by the handle 7 of FIG. 1, the operating mechanism 19 can also be actuated to open the separable contacts 17 by a trip circuit, such as trip assembly 21, in response to predetermined current conditions. The trip assembly 21 is responsive to current flowing through the separable contacts 17 and cooperates with the operating mechanism 19 to open the separable contacts 17. The trip assembly 21 is powered from the pigtail 6 (line neutral) and from an internal ground reference 20 that is energized by the line voltage of stab 5 when the separable contacts 17 are closed. The trip assembly 21 includes the conventional bimetal 23 which is heated by persistent overcurrents and bends to actuate the operating mechanism 19 to open the separable contacts 17. An armature 25 in the trip assembly 21 is attracted by the large magnetic force generated by very high overcurrents to also actuate the operating mechanism 19 and provide an instantaneous trip function.

The trip assembly 21 of the circuit breaker 1 is also provided with an arc fault detector (AFD) 27 and a ground fault detector (GFD) 29. The arc fault detector 27 may be, for instance, of the type which detects the step increases in current which occur each time an arc is struck, although other types of arc fault detectors could also be used. Suitable arc fault detectors are disclosed, for instance, in U.S. Pat. No. 5,224,006, with a preferred type described in U.S. Pat. No. 5,691,869 which is hereby incorporated by reference. The arc fault detector 27 senses the current in the electrical system 11 by monitoring the voltage across the bimetal 23 through the lead 31 to sense an arc fault current condition. As described in U.S. Pat. No. 5,691,869, the arc fault detector 27 includes circuitry which generates a pulse in response to each step change in current. The pulse signal is integrated with the result of the integration being attenuated over time. When the time attenuated accumulation of the pulses reaches a selected level, the arc fault detector 27 generates at its output an arc fault trip signal 32 which is active in response to the arc fault. In turn, the signal 32 is combined with a ground fault trip signal 33 of the ground fault detector 29 and is employed to actuate the operating mechanism 19 and open the separable contacts 17 in response to the fault.

The ground fault detector 29 may be of the well known dormant oscillator type in which case it utilizes a pair of sensing coils 34,35 to detect both line-to-ground and neutral-to-ground fault current conditions. If the arc fault detector 27 detects an arc fault in the electric power system 11, the trip signal 32 is generated which turns on a switch such as the silicon controlled rectifier (SCR) 37 to energize a trip solenoid 39. When the ground fault detector 29 detects a ground fault, it generates at its output the ground fault trip signal 33 which is active in response to the ground fault. The ground fault trip signal 33 is "ORed" with the arc fault trip signal 32 (i.e., an "OR" function of the outputs of the ground fault detector 29 and the arc fault detector 27), such that the combination of the signals 32,33 forms a fault protection trip signal 41.

Under normal operation, the trip signal 41 turns the SCR 37 on, energizes the trip solenoid 39 and, thereby, actuates the operating mechanism 19 to open the separable contacts 17 in response to the arc fault or ground fault. A resistor 43 in series with the coil of the solenoid 39 limits the coil current and a capacitor 44 protects the gate of the SCR 37 from voltage spikes and false tripping due to noise. In this manner, either the arc fault condition or the ground fault condition results in the interruption of electrical power independent of the other.

Both the arc fault detector 27 and the ground fault detector 29 may have test circuits (not shown).

In accordance with the invention, a suitable electro-mechanical interlock, such as solenoid 50, is potentially active when the circuit breaker operating handle 7 is in the open position (as shown in FIG. 1). The solenoid 50 includes a coil 51, which is powered from a line connection 52 to the stab 5 (line) and a neutral connection 54 to the pigtail 6 (line neutral).

Figure 3:
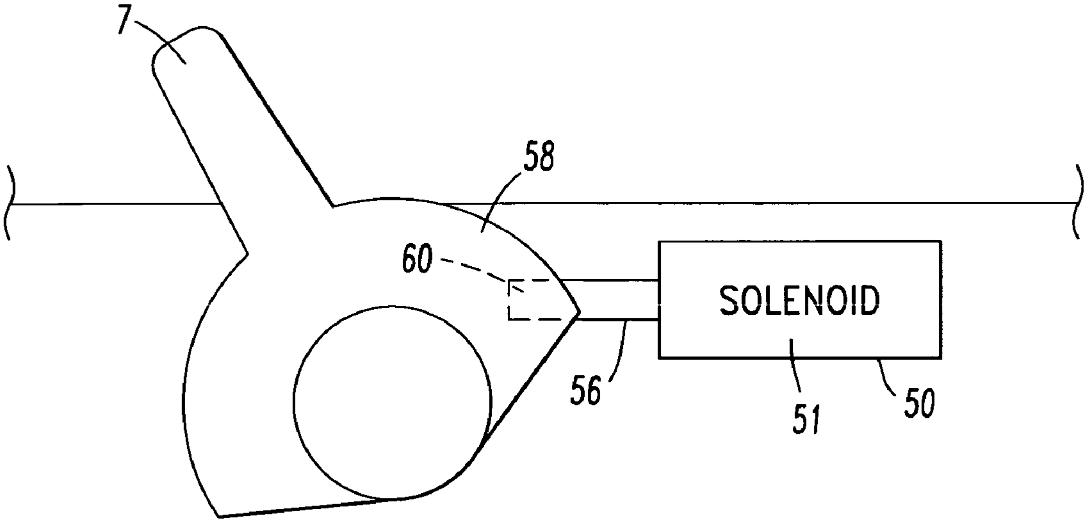
FIG. 3 is a block diagram of the circuit breaker operating handle as engaged by the solenoid interlock of FIG. 2.
Figure 4:
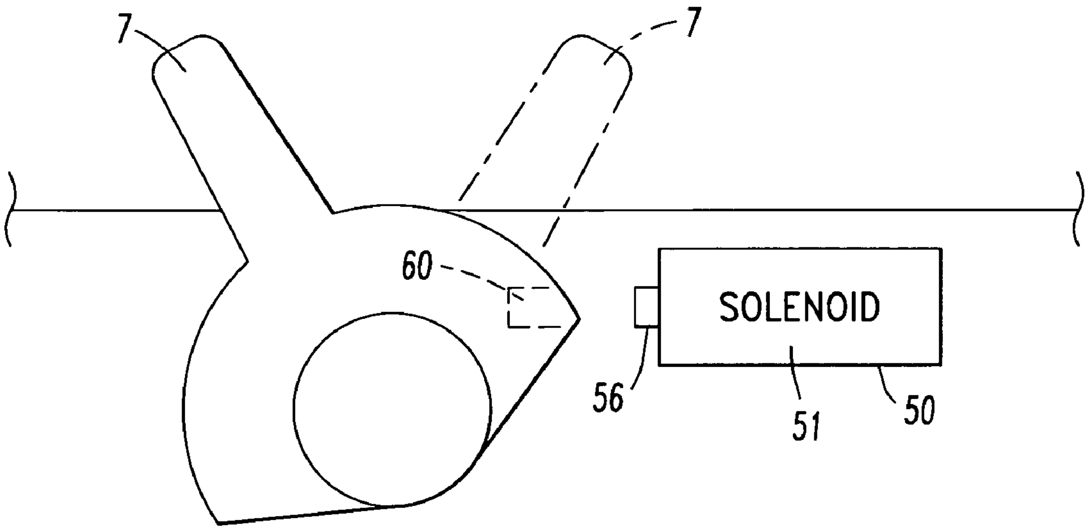
FIG. 4 is a block diagram of the energized solenoid interlock which is disengaged from the circuit breaker operating handle of FIG. 2.

When the solenoid 50 is energized, the solenoid plunger 56 disengages from the operating handle 7 to permit movement of the operating mechanism 19 from the open position to the closed position thereof. For example, this removes the solenoid plunger 56 from a portion of the operating handle 7 as is shown in FIG. 4. As shown in FIG. 3, the operating handle 7 includes an insertion barrier 58 with an opening 60 (shown in hidden line drawing) therein. The solenoid plunger 56 engages the operating handle 7 at the opening 60 when the solenoid coil 51 is not energized to prevent movement of the operating handle 7 from the open position (FIG. 3) to the closed position (shown in phantom line drawing in FIG. 4) thereof. Otherwise, when the solenoid 50 is de-energized (e.g., when the pigtail 6 (FIG. 1) is not electrically connected to a suitable line neutral bus), the solenoid plunger 56 engages a portion of the operating handle 7 as shown in FIG. 3, which prevents movement of the operating mechanism 19 from the open position to the closed position thereof and does not allow the operating handle 7 to be moved to its closed position (as shown in phantom line drawing in FIG. 4). Hence, the circuit breaker 1 must have the pigtail 6 properly electrically connected to energize the solenoid 50 and, thus, operate the circuit breaker 1. Otherwise, the solenoid 50 prevents closure of the separable contacts 17 and the supply of power to the load terminal 3 if the circuit breaker 1 is improperly wired.

If the pigtail 6 is removed from the line neutral bus (not shown) when the circuit breaker 1 is on, then the solenoid plunger 56 re-engages the operating handle 7 at the opening 60 when the circuit breaker 1 is turned off or is reset after a trip condition.

The arc fault detector 27 and/or the ground fault detector 29 may employ a combination of one or more of analog, digital and/or processor-based circuits.

Although both the arc fault detector 27 and the ground fault detector 29 are disclosed, one or both of those detectors 27,29 and/or any suitable trip circuit may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit breaker comprising:

a line connection;

a load connection;

separable contacts electrically connected between said line connection and said load connection;

a line neutral connection;

an operating mechanism adapted to open and close said separable contacts, said operating mechanism moving between an open position wherein said line connection is electrically disconnected from said load connection and a closed position wherein said line connection is electrically connected to said load connection;

a trip circuit responsive to current flowing through said separable contacts and cooperating with said operating mechanism in response to predetermined current conditions to open said separable contacts, said trip circuit being powered from said line connection and said line neutral connection; and an electro-mechanical device including a coil and a plunger, said coil being energized from said line connection and said line neutral connection, said plunger directly contacting said operating mechanism when said coil is not energized to prevent movement of said operating mechanism from the open position to the closed position thereof, said plunger being separated from said operating mechanism when said coil is energized to permit movement of said operating mechanism from the open position to the closed position thereof.

2. The circuit breaker of claim 1 wherein said line connection is a line terminal and said load connection is a load terminal.

3. The circuit breaker of claim 1 wherein said line neutral connection is a line neutral pigtail.

4. A circuit breaker comprising:

a line connection;

a load connection;

separable contacts electrically connected between said line connection and said load connection;

a line neutral connection;

an operating mechanism adapted to open and close said separable contacts, said operating mechanism moving between and open position wherein said line connection is electrically disconnected from said load connection and a close position wherein said line connection is electrically connected to said load connection;

a trip circuit responsive to current flowing through said separable contacts and cooperating with said operating mechanism in response to predetermined current conditions to open said separable contacts, said trip circuit being powered from said line connection and said line neutral connection; and an electro-mechanical device including a coil and a plunger, said coil being energized from said line connection and said line neutral connection, said plunger engaging said operating mechanism when said coil is not energized to prevent movement of said operating mechanism from the open position to the closed position thereof, said plunger disengaging from said operating mechanism when said coil is energized to permit movement of said operating mechanism from the open position to the closed position thereof, wherein said operating mechanism includes an operating handle; and wherein said plunger directly contacts said operating handle when said coil is not energized to prevent movement of said operating mechanism from the open position to the closed position thereof, said plunger being separated from said operating handle when said coil is energized to permit movement of said operating mechanism from the open position to the closed position thereof.

5. A circuit breaker comprising:

a line connection;

a load connection;

separable contacts electrically connected between said line connection and said load connection;

a line neutral connection;

an operating mechanism adapted to open and close said separable contacts, said operating mechanism moving between an open position wherein said line connection is electrically disconnected from said load connection and a closed position wherein said line connection is electrically connected to said load connection;

a trip circuit responsive to current flowing through said separable contacts and cooperating with said operating mechanism in response to predetermined current conditions to open said separable contacts, said trip circuit being powered from said line connection and said line neutral connection; and an electro-mechanical device including a coil and a plunger, said coil being energized from said line connection and said line neutral connection, said plunger engaging said operating mechanism when said coil is not energized to prevent movement of said operating mechanism from the open position to the closed position thereof, said plunger disengaging from said operating mechanism when said coil is energized to permit movement of said operating mechanism from the open position to the closed position thereof, wherein said operating mechanism includes an operating handle, wherein said plunger engages said operating handle when said coil is not energized to prevent movement of said operating mechanism from the open position to the closed position thereof, said plunger disengaging from said operating handle when said coil is energized to permit movement of said operating mechanism from the open position to the closed position thereof, wherein said operating handle includes an insertion barrier; and wherein said plunger engages the insertion barrier of said operating handle when said coil is not energized to prevent movement of said operating mechanism from the open position to the closed position thereof.

6. The circuit breaker of claim 1 wherein said trip circuit includes a ground fault trip circuit powered from said line connection and said line neutral connection.

7. The circuit breaker of claim 1 wherein said trip circuit includes an arc fault trip circuit powered from said line connection and said line neutral connection.

8. The circuit breaker of claim 1 wherein said trip circuit includes an arc fault trip circuit and a ground fault trip circuit powered from said line connection and said line neutral connection.

9. The circuit breaker of claim 1 wherein said electro-mechanical device is a solenoid.

10. The circuit breaker of claim 1 wherein said trip circuit is powered from said line neutral connection and from said line connection when said separable contacts are closed.

11. The circuit breaker of claim 1 wherein the coil of said electro-mechanical device is directly powered from said line connection and said line neutral connection.

12. The circuit breaker of claim 1 wherein said operating mechanism includes an operating handle; and wherein said plunger directly contacts said operating handle when said coil is not energized to prevent movement of said operating mechanism from the open position to the closed position thereof, said plunger being separated from said operating handle when said coil is energized to permit movement of said operating mechanism from the open position to the closed position thereof.

* * * * *